United States Patent
Hartung

(10) Patent No.: US 11,149,585 B2
(45) Date of Patent: Oct. 19, 2021

(54) TURBOMACHINE ASSEMBLY WITH A DETUNING DEVICE FOR DIFFERENT DETUNING OF NATURAL FREQUENCIES OF THE BLADES

(71) Applicant: MTU Aero Engines AG, Munich (DE)

(72) Inventor: Andreas Hartung, Munich (DE)

(73) Assignee: MTU Aero Engines AG, Munich (DE)

(*) Notice: Subject to any disclaimer, the term of this patent is extended or adjusted under 35 U.S.C. 154(b) by 190 days.

(21) Appl. No.: 16/420,619

(22) Filed: May 23, 2019

(65) Prior Publication Data

US 2019/0360354 A1 Nov. 28, 2019

(30) Foreign Application Priority Data

May 24, 2018 (DE) ...................... 10 2018 208 229.4

(51) Int. Cl.
*F01D 25/06* (2006.01)
*F01D 5/22* (2006.01)

(52) U.S. Cl.
CPC ............... *F01D 25/06* (2013.01); *F01D 5/22* (2013.01)

(58) Field of Classification Search
CPC ... F01D 25/06; F01D 5/22; F01D 5/34; F01D 9/042; F01D 5/3007; F04D 29/322; F04D 29/666; F05D 2260/961
USPC ....................................................... 415/119
See application file for complete search history.

(56) References Cited

U.S. PATENT DOCUMENTS

| | | | |
|---|---|---|---|
| 2,349,187 A * | 5/1944 | Meyer ....................... | F01D 5/26 416/190 |
| 5,205,713 A * | 4/1993 | Szpunar ..................... | F01D 5/26 416/193 A |
| 6,494,679 B1 * | 12/2002 | Gadre ........................ | F01D 5/24 416/145 |
| 6,520,286 B1 * | 2/2003 | Frederiksen ............ | F02P 5/153 181/256 |
| 9,797,270 B2 | 10/2017 | O'Leary | |
| 9,822,644 B2 | 11/2017 | Tardif et al. | |
| 2010/0021305 A1 * | 1/2010 | Martensson .............. | F01D 5/34 416/186 R |
| 2011/0135479 A1 * | 6/2011 | Ueda ..................... | F04D 29/542 416/179 |

(Continued)

FOREIGN PATENT DOCUMENTS

| | | |
|---|---|---|
| DE | 102016205995 A1 | 10/2017 |
| DE | 102016205997 A1 | 10/2017 |
| EP | 2159379 A2 | 3/2010 |

(Continued)

*Primary Examiner* — J. Todd Newton
(74) *Attorney, Agent, or Firm* — Barlow, Josephs & Holmes, Ltd.; David R. Josephs

(57) ABSTRACT

The present invention relates to a turbomachine assembly with an annular flow cascade, which has a plurality of blades, which are arranged distributed in a peripheral direction, and a detuning device for different detuning of natural frequencies of the blades, wherein the detuning device has a ring that revolves in the peripheral direction, or wherein the detuning device has all detuning elements that are arranged at the blade, which follow one another in a row in the peripheral direction, and are designed in such a way that, during operation, first blades of the flow cascade each contact at most one, in particular, no movable detuning element of the detuning device.

9 Claims, 1 Drawing Sheet

(56) References Cited

U.S. PATENT DOCUMENTS

2016/0298546 A1* 10/2016 Edwards ................... F01D 5/16

FOREIGN PATENT DOCUMENTS

| | | |
|---|---|---|
| EP | 2806105 A1 | 11/2014 |
| EP | 2977553 A1 | 1/2016 |
| EP | 3093439 A1 | 11/2016 |
| EP | 3181824 A1 | 6/2017 |
| EP | 3196413 A1 | 7/2017 |
| EP | 3231998 A1 | 10/2017 |
| EP | 2500520 A3 | 12/2017 |
| JP | 2004100553 A | 4/2004 |
| JP | 2006144575 A | 6/2006 |
| WO | 2008041889 A1 | 4/2008 |
| WO | 2012038406 A1 | 3/2012 |

* cited by examiner

TURBOMACHINE ASSEMBLY WITH A DETUNING DEVICE FOR DIFFERENT DETUNING OF NATURAL FREQUENCIES OF THE BLADES

BACKGROUND OF THE INVENTION

The present invention relates to a turbomachine assembly, a turbomachine, in particular a gas turbine, in particular an aircraft engine gas turbine, having the turbomachine assembly as well as to a method for producing the turbomachine assembly.

Known from WO 2012/038406 A1 is a blade arrangement in which a respective damping element is arranged between all pairs of directly adjacent blades, wherein, for detuning of the natural frequencies of the blades, at least two pairs of blades have different damping elements.

SUMMARY OF THE INVENTION

An object of an embodiment of the present invention is to improve the operation of a turbomachine.

This object is achieved by a turbomachine assembly of the present invention. A turbomachine having (at least) one turbomachine assembly a method for producing (at least) one turbomachine assembly are described in detail below.

In accordance with an embodiment of the present invention, a turbomachine assembly has an annular flow cascade with a plurality of blades, which are arranged distributed in a peripheral direction.

In one embodiment, the blades are rotating blades, which, during operation, rotate around a (main) machine axis or axis of rotation of the turbomachine or are or will be provided or used, in particular set up, for this purpose and, in one embodiment, are joined to a rotor of the turbomachine. On account of the rotations, a detuning of the natural frequencies of rotating blades is an especially advantageous application of the present invention.

In another embodiment, the blades are stationary guide vanes or guide vanes that are joined to a housing or are or will be provided or used, in particular set up, for this purpose. On account of housing vibrations and/or the incident flow, a detuning of the natural frequencies of guide vanes is an especially advantageous application of the present invention.

In an embodiment, two or more, in particular all, blades are formed integrally with one another and/or with a common annular disk or are joined to one another in a material-bonded manner. In an embodiment, the blade cascade can accordingly be formed as a so-called blisk or in the form of successive so-called blade clusters, each having two or more blades that are integrally formed with one another or are joined to one another in a material-bonded manner.

In an embodiment, the blades are fastened individually or in groups to a common annular disk and can be detached in a non-destructive manner, and are therefore fastened, in particular, as separate blades or in the form of successive so-called blade clusters, each having two or more blades that are integrally formed with one another or are joined to one another in a material-bonded manner.

In accordance with an embodiment of the present invention, the turbomachine assembly has a one-part or multipart detuning device, by way of which or by use of which the natural frequencies of the blades, in particular the identical bending and/or torsional natural frequencies, are differently detuned or shifted or which is or will be provided, in particular set up, or used for this purpose. By way of the different detuning or the different natural frequencies thereby brought about, it is possible in an embodiment to reduce resonances and/or component loads.

In accordance with an embodiment of the present invention, the detuning device has a ring that revolves in the peripheral direction.

This is based on the idea of utilizing a ring for different detuning of natural frequencies, instead of individual movable elements, such as those described in WO 2012/038406 A1. In this way, in an embodiment, it is advantageously possible also to detune blisks or clusters, in particular in terms of the techniques of assembly and/or installation, instead of the separate individual blades of WO 2012/038406 A1. Similarly, it is also possible to detune individual blades by way of a ring, in particular in terms of the techniques of assembly and/or installation.

In an embodiment, the ring is closed in the peripheral direction. In this way, in an embodiment, it can be fastened more securely at the blade cascade. In another embodiment, the ring has a slot that is transverse to the peripheral direction. In this way, in an embodiment, the ring can be mounted at the blade cascade in a simpler manner.

In a further development, the revolving ring, in particular only the blades of the flow cascade, in particular the blades of the flow cascade chosen from a subset, has a radial depression (in each case). In the present case, these blades are referred to as first blades, without limiting their generality, in order to distinguish them from other blades of the flow cascade, in particular the remaining blades of the flow cascade, which, in the present case, are also correspondingly referred to as second blades, and under which, in each case, the revolving ring correspondingly has no radial depressions or else a smaller radial depression (in comparison to the radial depressions under these first blades).

By way of the radial depressions under these first blades, they are advantageously detuned differently than these second blades, in particular in terms of the techniques of assembly and/or installation.

Such a ring is advantageous, in particular, for the detuning of blisks, although it is not limited thereto, and, in particular, can also be used for clusters as well as for individual blades.

In an embodiment, at least and/or at most one of these first blades and, in particular, at least and/or at most two of these first blades, is or will be or are or will be arranged between at least two successive ones of these second blades. Additionally or alternatively, at least and/or at most one of these second blades, in particular at least and/or at most two of these second blades, is or will be or are or will be arranged between at least two successive ones of these first blades.

Surprisingly, it has been found that, in each case, through these lower and upper limits, in particular in combination, especially advantageous detunings can be realized.

Additionally or alternatively, in a further development with blades of the flow cascade having blades or groups that are integrally formed or joined in a material-bonded manner, which, in the present case, without limitation to the generality thereof, are likewise analogously referred to as second blades or groups, the revolving ring has (in each case) a second fit and/or contact surface, and with blades of the flow cascade joined to other blades or groups that are integrally formed or joined in a material-bonded manner, which, in the present case, without limitation of the generality thereof, are analogously referred to as first blades or groups, the revolving ring has (in each case) a first fit that is wider than the second fit and/or a first contact surface that is smaller than the second contact surface. Thus, for example, the second fit can be a press fit and the first fit can be a transition or clearance fit or the second fit can be a transition fit and the first fit can be a clearance fit.

By way of the different fits or contact surfaces, these second and first blades or groups can advantageously be detuned differently, in particular in terms of the techniques of assembly and/or installation.

Such a ring is, in particular, advantageous for the detuning of clusters, although it is not limited to them, and, in particular, can also be used for blisks as well as for individual blades.

In an embodiment, at least and/or at most one of these first blades or groups and, in particular, at least and/or at most two of these first blades or groups is or will be or are or will be arranged between at least two successive ones of these second blades or groups. Additionally or alternatively, at least and/or at most one of these second blades or groups, in particular at least and/or at most two of these second blades or groups, is or will be or are or will be arranged between at least two successive ones of these first blades or groups.

Surprisingly, it has been found that, in each case, through these lower and upper limits, in particular in combination, especially advantageous detunings can be realized.

In accordance with an embodiment of the present invention, the detuning device has all detuning elements that are movably arranged at the blades, which follow one another in a row in the peripheral direction and are designed in such a way that, during operation, blades of the flow cascade, which, in the present case, without limitation of the generality thereof, are analogously likewise referred to as first blades, each contact at most one—in particular, no—movable detuning element of this detuning device, and, in an embodiment, are therefore free of movable detuning elements of this detuning device. In other words, in an embodiment, selected blades of the blade cascade are specifically not equipped with a detuning element or else are equipped on only one side or with one detuning element.

This is based on the idea that, instead of what is done in WO 2012/038406 A1, namely, to arrange a movable element, which has the same basic functionality and, if appropriate, a different design, at all blades on both sides in each case, one (first) blade or a plurality of (first) blades is or are left out or omitted on one side or on both sides in a targeted manner or systematically during the distribution of such movable detuning elements.

In this way, in an embodiment, it is possible, in contrast to WO 2012/038406 A1, to detune the blades more strongly with respect to one another. Such a detuning device, which has movable detuning elements that follow one another in a row in the peripheral direction and will be or are arranged in a targeted manner or systematically at first blades not at all or not doubled or not on both sides, is advantageous, in particular, for the detuning of individual blades, although it is not limited thereto, and, in particular, can also be used advantageously for blisks as well as for clusters.

In an embodiment, at least and/or at most one other blade of the blade cascade and, in particular, at least and/or at most two other blades of the blade cascade is or will be or are or will be arranged between at least two successive ones of these first blades. Thus, in a further development, under at most each third blade counted in the peripheral direction, a respective movable detuning element will be or is arranged on one side or on both sides. Then, in an embodiment, none of the movable detuning elements of the detuning device is arranged under at least one of the two blades adjacent to these third blades in each case.

In an embodiment, the detuning device, which has all detuning elements that are movably arranged at the blades and follow one another in a row in the peripheral direction, is designed in such a way that, at blades of the flow cascade that, in the present case, without limitation of the generality thereof, analogously are likewise referred to as second blades, at least two of the movable detuning elements are arranged in each case.

Surprisingly, it has been found that, in each case, through these lower and upper limits, in particular in combination, especially advantageous detunings can be realized.

As explained above, for a more compact illustration of blades at which, in each case, at most one movable detuning element of the detuning device having this detuning element is arranged, blades under which the revolving ring of this detuning device having this detuning element has a (larger) radial depression, as well as blades with which the revolving ring of the detuning device having this detuning element has a wider fit or a smaller contact surface are referred to in each case as first blades (of the respective embodiment); blades at which, in each case, at least two movable detuning elements of the detuning device having these detuning elements are arranged, blades under which the revolving ring of the detuning device having these detuning elements has no or a smaller radial depression, as well as blades with which the revolving ring of the detuning device having these detuning elements has a tighter fit or a larger contact surface are referred to in each case as second blades (of the respective embodiment).

In an embodiment, the detuning device will be or is arranged radially inside at the flow cascade and, in a further development, the detuning device is arranged under a radial inner shroud or radial inner platform. In an embodiment, the movable detuning elements of the detuning device will be or are arranged in cavities of platforms, in particular platforms of adjacent blades.

Surprisingly, it has been found that, in this way, especially advantageous detunings can be realized.

The invention is used with special advantage, on account of the flow and vibrational relationships, in compressors (compressor stages) or turbines (turbine stages) of gas turbines, in particular aircraft engine gas turbines.

In accordance with an embodiment of the present invention, for the production or during the production of a turbomachine assembly described here, natural frequencies of the blades are detuned differently by the detuning device, and, for this purpose, in an embodiment, the ring revolving in the peripheral direction is arranged at the flow cascade and, in another embodiment, the movable detuning elements are distributed in the peripheral direction with at least partial omission of the first blades in such a way that, during operation, the first blades of the flow cascade each contact at most one—and particularly no—movable detuning element of the detuning device.

In an embodiment, an axial direction is parallel to a (main) machine axis or the axis of rotation of the turbomachine, a peripheral direction is a circumferential direction or direction of revolution or rotation around this axis, and a radial direction is perpendicular to the axial direction and the peripheral direction.

BRIEF DESCRIPTION OF THE DRAWING FIGURES

Other advantageous further developments of the present invention ensue from the dependent claims and the following description of preferred embodiments. Shown for this purpose in a partially schematic manner:

DESCRIPTION OF THE INVENTION

Figure 1:
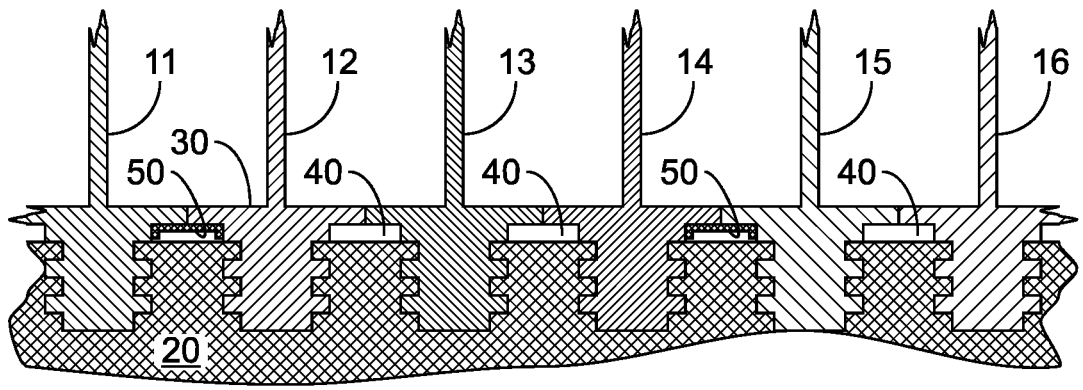
FIG. 1 is a part of a turbomachine assembly in accordance with an embodiment of the present invention in a meridional section.

FIG. 1 shows a part of a turbomachine assembly in accordance with an embodiment of the present invention in a meridional section.

The turbomachine assembly has an annular flow cascade, which is shown only partially in FIG. 1, and has a plurality of individual blades 11-16, which are arranged distributed in a peripheral direction (horizontal in FIG. 1) and are fastened in a common annular disk 20 in a detachable manner.

A detuning device of the turbomachine assembly has all detuning elements 50, which are arranged movably at the blades, follow one another in a row in the peripheral direction, and are arranged in cavities 40 under platforms 30 of the blades, and is designed in such a way that, during operation, the blades 11, 12, 14, and 15 can each contact one of the movable detuning elements 50 of the detuning device, whereas in contrast, the blades 13, 16 contact none of the movable detuning elements. Correspondingly, in an embodiment, the blades 11-16 represent first blades in the sense of the present invention, and, in another embodiment, only the blades 13, 16 represent first blades in the sense of the present invention.

Figure 2:
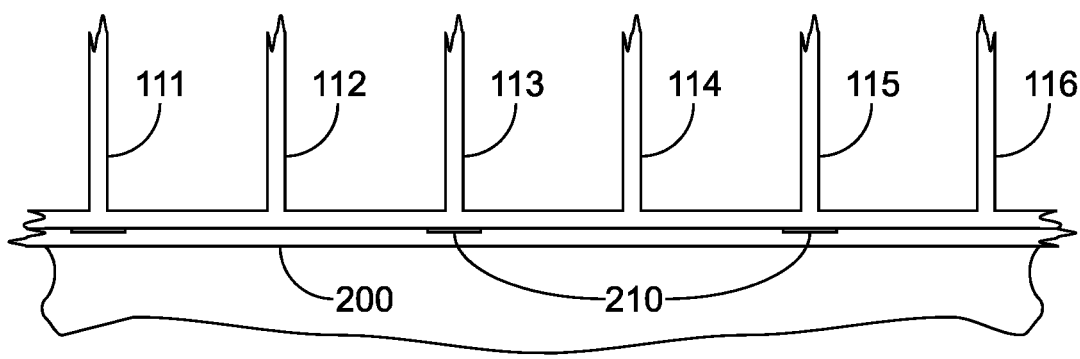
FIG. 2 is a part of a turbomachine assembly in accordance with another embodiment of the present invention in an axial view from the top.

FIG. 2 shows a part of a turbomachine assembly in accordance with another embodiment of the present invention in an axial view from the top.

In this embodiment, the blade cascade with the blades 111-116 is formed as a blisk, at which a detuning device is arranged radially inside (as in FIG. 1 bottom) in the form of a revolving ring 200.

Under the first blades 111, 113, 115 of the flow cascade, said ring has a radial depression 210 (depicted in exaggerated form in FIG. 2) and, under the second blades 112, 114, 116 of the flow cascade, said ring has no radial depression.

Figure 3:
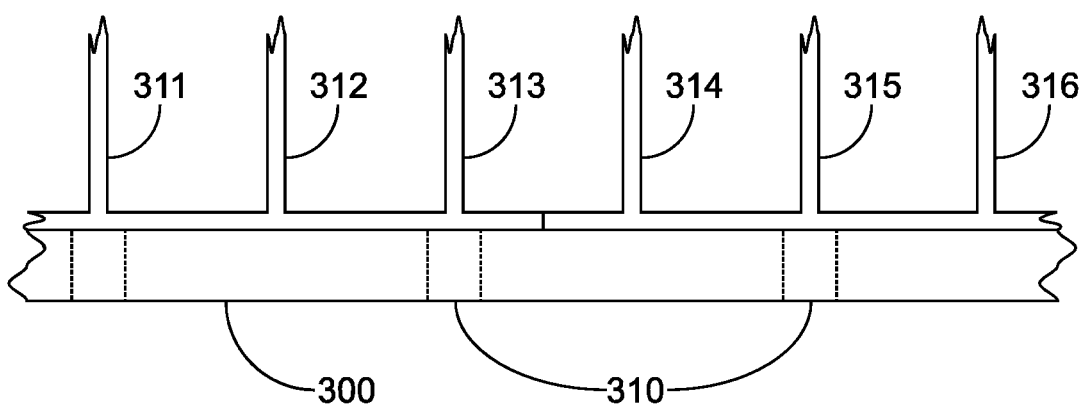
FIG. 3 is a part of a turbomachine assembly in accordance with another embodiment of the present invention in an axial view from the top.

FIG. 3 shows a part of a turbomachine assembly in accordance with another embodiment of the present invention in an axial view from the top.

In this embodiment, the blade cascade with the blades 311-316 is designed in the form of clusters (311-313), (314-316), at which a detuning device is arranged radially inside (as in FIG. 2 bottom) in the form of a revolving ring 300.

In each case, said ring has a second fit and/or contact surface with the second blades 312, 314, 316, and, in each case, a first fit, indicated in FIG. 3 by dashed lines and identified as 310, with the first blades 311, 313, 315 that is wider than the second fit and/or a first contact surface that is smaller than the second contact surface.

Although, in the preceding description, exemplary embodiments were discussed, it is noted here that a large number of modifications are possible. Moreover, it is noted that what is involved in the exemplary embodiments are only examples, which are in no way intended to limit the protective scope, the applications, and the structure. Instead, the preceding description affords the person skilled in the art a guideline for the implementation of at least one exemplary embodiment, whereby diverse modifications can be carried out, in particular in terms of the function and arrangement of the described component parts, without leaving the protective scope, as ensues from the claims and the combinations of features equivalent to said claims.

What is claimed is:

1. A turbomachine assembly comprising,
an annular flow cascade having a plurality of blades, the plurality of blades are arranged distributed in a peripheral direction, and
a detuning device for different detuning of natural frequencies of the plurality of blades,
wherein the detuning device has a ring that revolves in the peripheral direction or wherein the detuning device has all detuning elements that are movably arranged at a respective one of the plurality of blades, which follow one another in a row in the peripheral direction and are designed in such a way that, during operation, a plurality of first blades of the annular flow cascade each contact at most one movable detuning element of the detuning device.

2. The turbomachine assembly according to claim 1, wherein between at least two successive ones of the plurality of first blades, at least and/or at most one other blade of the annular flow cascade are arranged.

3. The turbomachine assembly according to claim 1, wherein at least two blades of the plurality of blades are formed integrally with one another and/or are formed in a common annular disk or are joined to one another in a material-bonded manner, and/or the plurality of blades are fastened individually or in groups at a common annular disk so as to be detachable in a non-destructive manner.

4. The turbomachine assembly according to claim 1, wherein the revolving ring has a radial depression under the plurality of first blades of the annular flow cascade and no depression or a smaller radial depression under a plurality of second blades of the annular flow cascade.

5. The turbomachine assembly according to claim 4, wherein, between at least two successive ones of these second blades, at least and/or at most one of these first blades are arranged, and/or in that, between at least two successive ones of these first blades, at least and/or at most one of these second blades are arranged.

6. The turbomachine assembly according to claim 1, wherein the revolving ring has a second fit and/or contact surface with a plurality of second blades or a second groups of blades of the annular flow cascade that are formed integrally or in a material-bonded manner, and has a first fit with the plurality of first blades or a first groups of blades of the annular flow cascade that are formed integrally or in a material-bonded manner and/or a first contact surface that is smaller than the second contact surface.

7. The turbomachine assembly according to claim 6, wherein, at least and/or at most one of the plurality of first blades or first groups of blades are arranged between at least two successive ones of these second blades or groups, and/or in that, at least and/or at most one of these plurality of second blades or second groups of blades are arranged between at least two successive ones of these plurality of first blades or first groups of blades.

8. The turbomachine assembly according to claim 1, wherein the plurality of blades and/or the detuning device are arranged radially inside at the annular flow cascade and the movable detuning elements are arranged in cavities of platforms of adjacent blades.

9. The turbomachine assembly according to claim 1, wherein natural frequencies of the plurality of blades are configured and arranged to be detuned differently by the detuning device and the ring revolving in the peripheral direction is arranged at the annular flow cascade or the movable detuning elements are distributed in the peripheral direction with at least partial omission of the plurality of first blades whereby, during operation, the plurality of first blades of the annular flow cascade each contact at most one movable detuning element of the detuning device.

\* \* \* \* \*